(12) United States Patent
Smith

(10) Patent No.: US 7,793,164 B2
(45) Date of Patent: Sep. 7, 2010

(54) ERROR CODES FOR PRODUCTS

(75) Inventor: Darren Smith, Bellevue, WA (US)

(73) Assignee: Nintendo Co., Ltd., Kyoto (JP)

( * ) Notice: Subject to any disclaimer, the term of this patent is extended or adjusted under 35 U.S.C. 154(b) by 768 days.

(21) Appl. No.: 11/504,109

(22) Filed: Aug. 15, 2006

(65) Prior Publication Data

US 2007/0226581 A1    Sep. 27, 2007

Related U.S. Application Data

(60) Provisional application No. 60/765,171, filed on Feb. 6, 2006.

(51) Int. Cl.
*G06F 11/00*    (2006.01)

(52) U.S. Cl. .......................................... 714/52; 714/48

(58) Field of Classification Search .................... 714/52, 714/47, 48, 758, 25, 37; 463/1
See application file for complete search history.

(56) References Cited

U.S. PATENT DOCUMENTS

| | | | | |
|---|---|---|---|---|
| 5,546,316 | A | * | 8/1996 | Buckley et al. ............. 700/233 |
| 6,754,854 | B2 | * | 6/2004 | Kurrasch ..................... 714/47 |
| 7,197,534 | B2 | * | 3/2007 | Donoho et al. .............. 709/204 |
| 2007/0010330 | A1 | * | 1/2007 | Cooper et al. .................. 463/42 |
| 2007/0101208 | A1 | * | 5/2007 | Mohr .......................... 714/57 |
| 2008/0249658 | A1 | * | 10/2008 | Walker et al. ............... 700/236 |

* cited by examiner

*Primary Examiner*—Dieu-Minh Le
(74) *Attorney, Agent, or Firm*—Nixon & Vanderhye P.C.

(57) ABSTRACT

An example system and method for generating an error code involve detecting an error condition of a product and generating an error code by combining information indicative of the detected error condition with an identifier associated with the product.

16 Claims, 5 Drawing Sheets

ERROR CODES FOR PRODUCTS

CROSS-REFERENCE TO RELATED APPLICATION

This application claims the benefit of provisional U.S. Application No. 60/765,171, filed Feb. 6, 2006, the contents of which are incorporated herein in their entirety.

BACKGROUND AND SUMMARY

The subject patent application generally relates to error codes for products and, more specifically, to product- or user-specific errors codes for products.

Error codes are often generated when hardware or software malfunctions in some manner. For example, when a software application running on a computer "crashes", an error code providing an identifier indicative of the error may be provided on a display screen of the computer. Using the error code, a user can consult documentation for the software to determine the cause of the crash and suggested steps or procedures for recovery. In other instances, the user can contact (e.g., by calling) a customer service representative and provide the error code to the representative, who can use the error code to determine the cause of the crash and lead the user through suggested steps or procedures for recovery.

By way of illustration, various versions of Microsoft Windows operating systems generate so-called "blue screens of death" when there is a system error. For example, when there is a boot loader error in which the operating system cannot access the boot partition, an error code like the following is generated:

STOP    0x0000007B    (INACCESSIBLE_BOOT_DEVICE).

Product documentation for this error code may suggest that the user attempt to recover from this error by booting the computer system using the media (e.g., CD-ROM) on which the operating system was provided.

The instant patent application describes the use of product- or user-specific error codes which include information that identifies a particular product or user, in addition to information indicative of the error that caused a product (e.g., hardware or software) to malfunction, crash or otherwise become wholly or partly inoperable. Product- or user-specific error codes can enable better and more efficient customer assistance because an assistance provider (e.g., documentation, a customer-service representative, a voice-response unit, a web site, etc.) is able to provide assistance based, for example, on information that may be unique to the particular user or the user's product. The part of the error code that identifies a product or user may be used, for example, to automatically access a database that includes information regarding previous errors or problems associated with the user's product or with the user.

By way of illustration, a particular software product may encounter certain types of errors more frequently when running on some hardware platforms than on others. By having an error code which includes information that identifies the hardware platform, assistance can be more easily provided if the software product crashes. For example, a customer service representative can assist a user in recovering from an error using a "script" that is most likely to work for the user's particular product. This can reduce the amount of time a customer service representative must spend with a particular user.

In addition, while a customer service representative can ask a user to verbally provide product information, information such as a product code may not be readily available to the user and the search for such information can increase the frustration level of a user whose product is not operating properly. Moreover, the search for such information while on a call also increases the amount of time a customer service representative must spend with a particular user.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION OF EXAMPLE EMBODIMENTS

Figure 1:
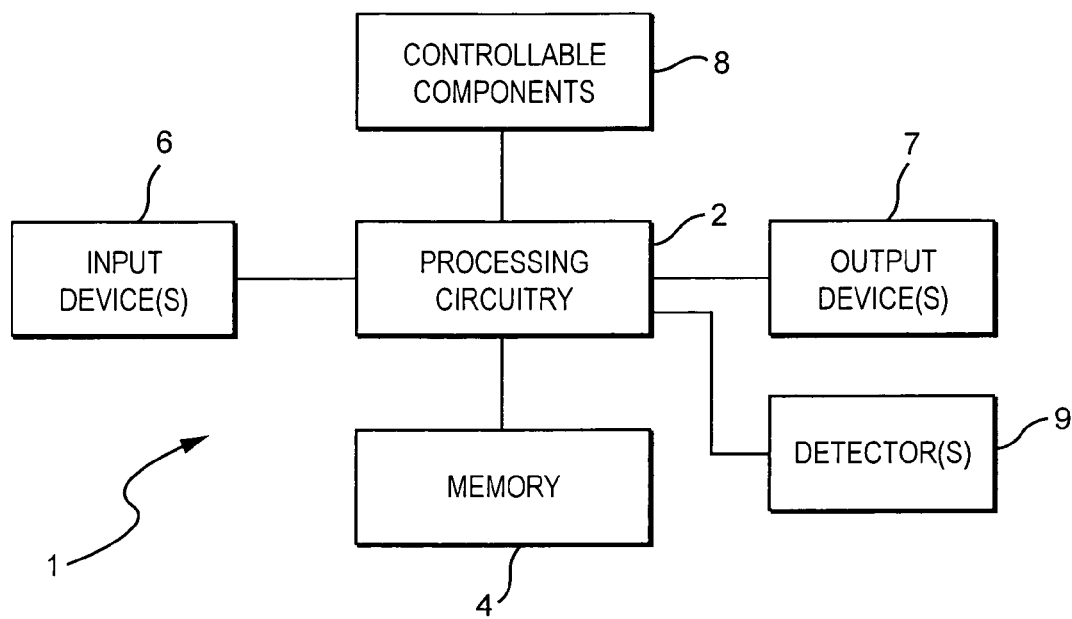
FIG. 1 is a block diagram of an example product in which error codes as described herein may be implemented.

The error codes described in this application can be used with various types of products including vehicles (such as cars, trucks, etc.), home appliances, game devices, televisions, computers, MP3 players, DVD players, set-top boxes, and the like. These products may be generally arranged along the lines shown in FIG. 1 which shows a product 1 that includes processing circuitry 2 which controls the overall operation of the product. A memory 4 is accessible to the processing circuitry and stores an operating program and data used by the processing circuitry to effect the aforementioned control. Memory 4 may include read/write memory for storing data during product operation (such as status data) and read-only memory for storing the operating program. Memory 4 may include a combination of on-board and removable memory. The removable memory may be in the form of magnetic disks, memory cards, optical disks and the like. Input device(s) 6 such as a keypad, a joystick, a touch-sensitive screen, switches, buttons and the like provide inputs to the processing circuitry 2. Output device(s) 7 such as displays, speakers, printers and the like provide outputs to a user.

Processing circuitry 2 controls controllable components 8 of the product 1. These controllable components will of course vary from product to product. For example, in the case of a television, the controllable components may include a tuner and decoding circuitry for decoding received audio and video data. In the case of an MP3 player, the controllable components may include audio playback circuitry for playing back songs stored in memory (e.g., memory 4).

The example product of FIG. 1 is shown as including input device(s), output device(s) and memory as components thereof. However, the product need not include these elements as parts thereof, but instead may be connectable to such elements. For example, a desktop computer need not include keypads, speakers or monitors as integral parts thereof, but the desktop computer typically includes connectors or interfaces for connecting to such elements in a wired or wireless manner.

In an example embodiment, processing circuitry 2 executes program instructions for generating the error codes described herein. These program instructions may be provided in memory 4 (on-board or removable or both). A carrier wave may be modulated by a signal representing the program instructions. As will be explained in greater detail below, the program instructions, when executed by the processing circuitry, detect an error condition of the product and automatically generate an error code by combining information (e.g., an alphanumeric string) indicative of the detected error condition with at least an identifier associated with the product or the user of the product.

The processing circuitry may monitor certain variables during operation of the product. These variables may be monitored using hardware, firmware and/or software. For example, detector(s) 9 such as temperature detectors, voltage and current detectors, or any other type of detector suitable for monitoring particular aspects of product operation may be used. If the variables monitored by these detector(s) fall outside certain limits as determined, for example, in software, an error condition may be detected. The processing circuitry itself may also detect errors by, for example, monitoring the availability of data which is needed for proper operation of the product. For example, if the processing circuitry cannot load particular data needed for operation of the product, the processing circuitry may detect an error.

Based on the type of error detected, an error message is generated. For example, memory 4 of the product may include a database of error messages associated with particular errors or types of errors. As explained in greater detail below, these error messages are output with an error code generated by combining information indicative of the detected error condition with at least an identifier associated with the product or the user of the product.

Figure 2:
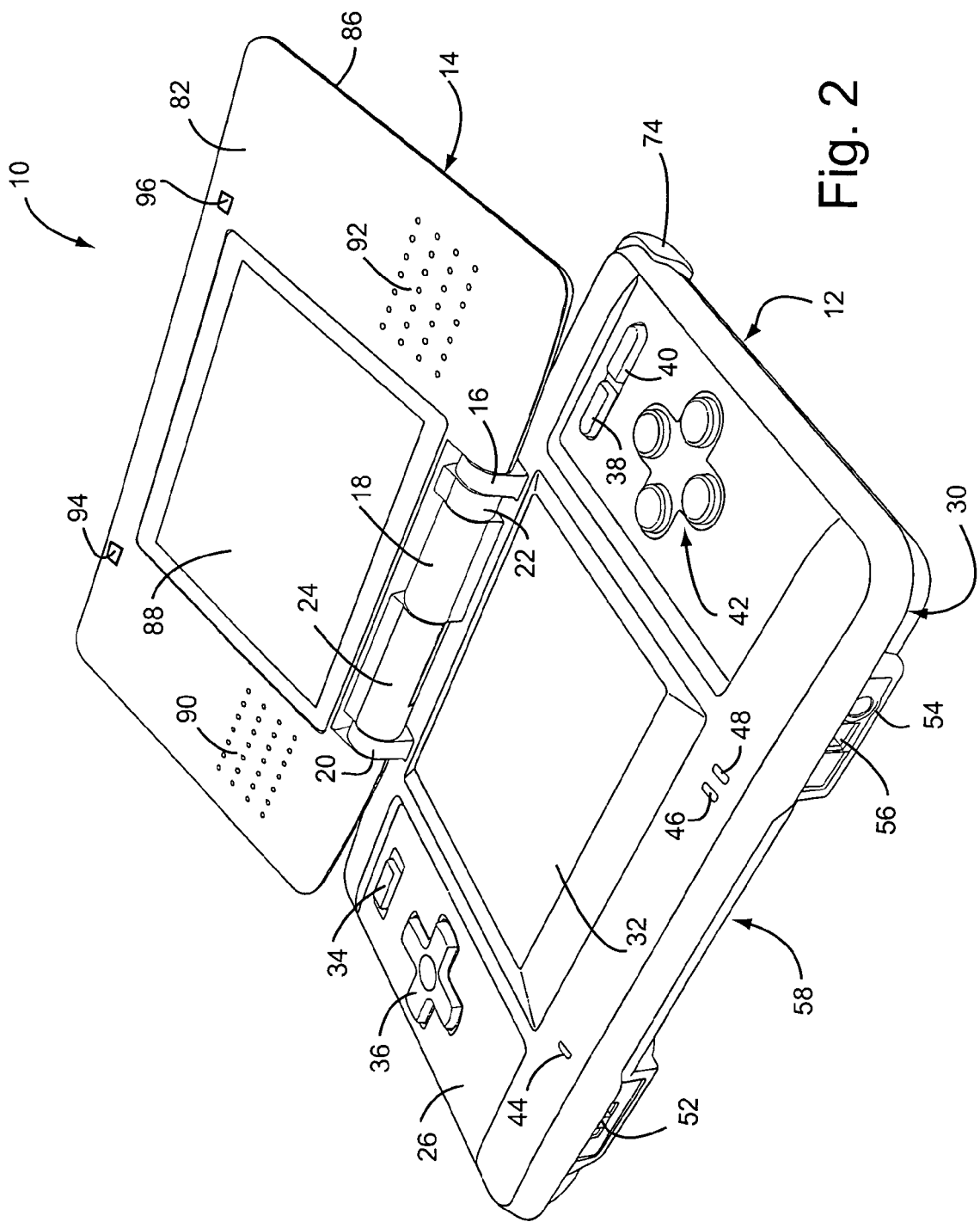
FIGS. 2 and 3 show a specific example of a game machine in which the error codes described herein may be implemented.
Figure 3:
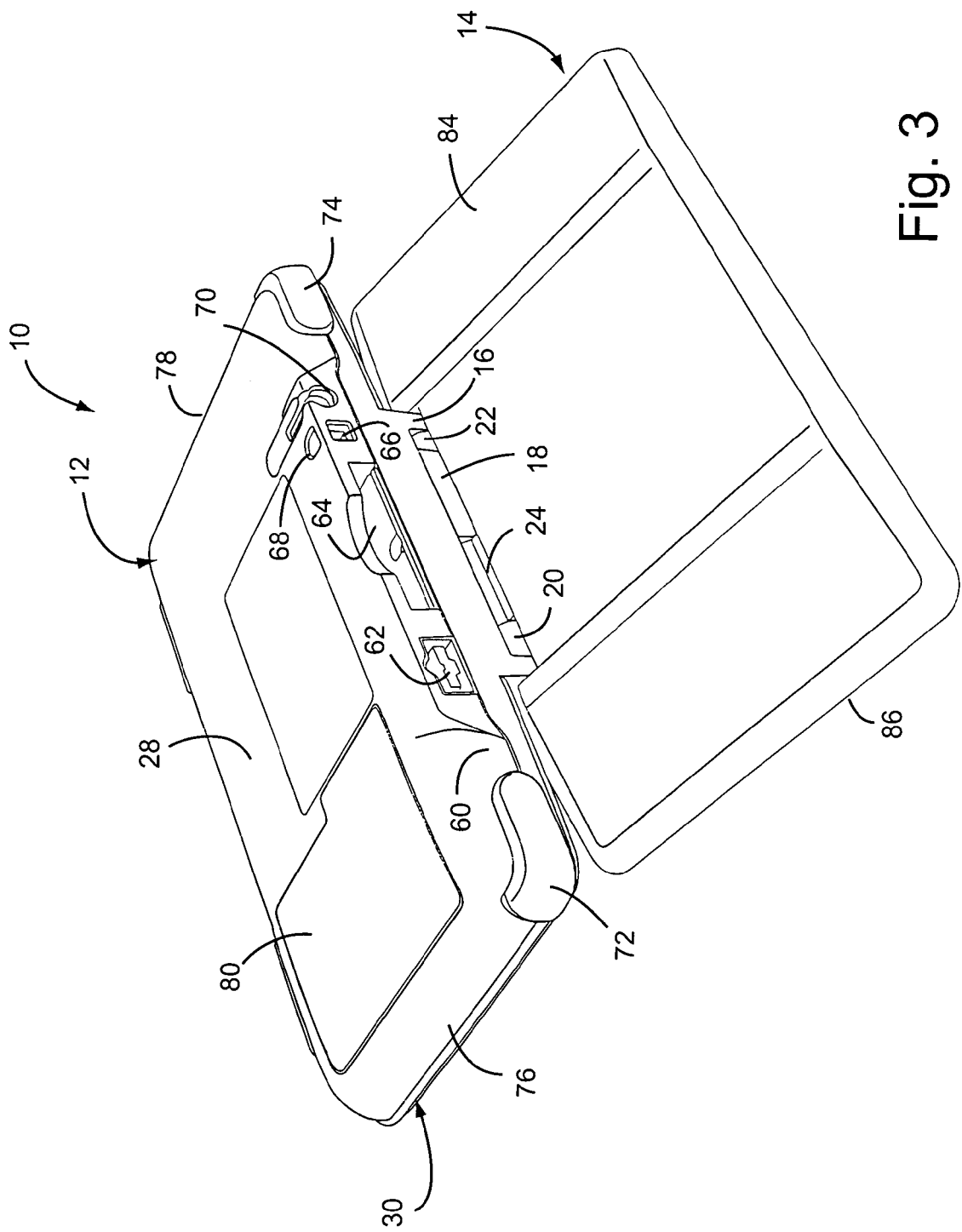
Figure 4:
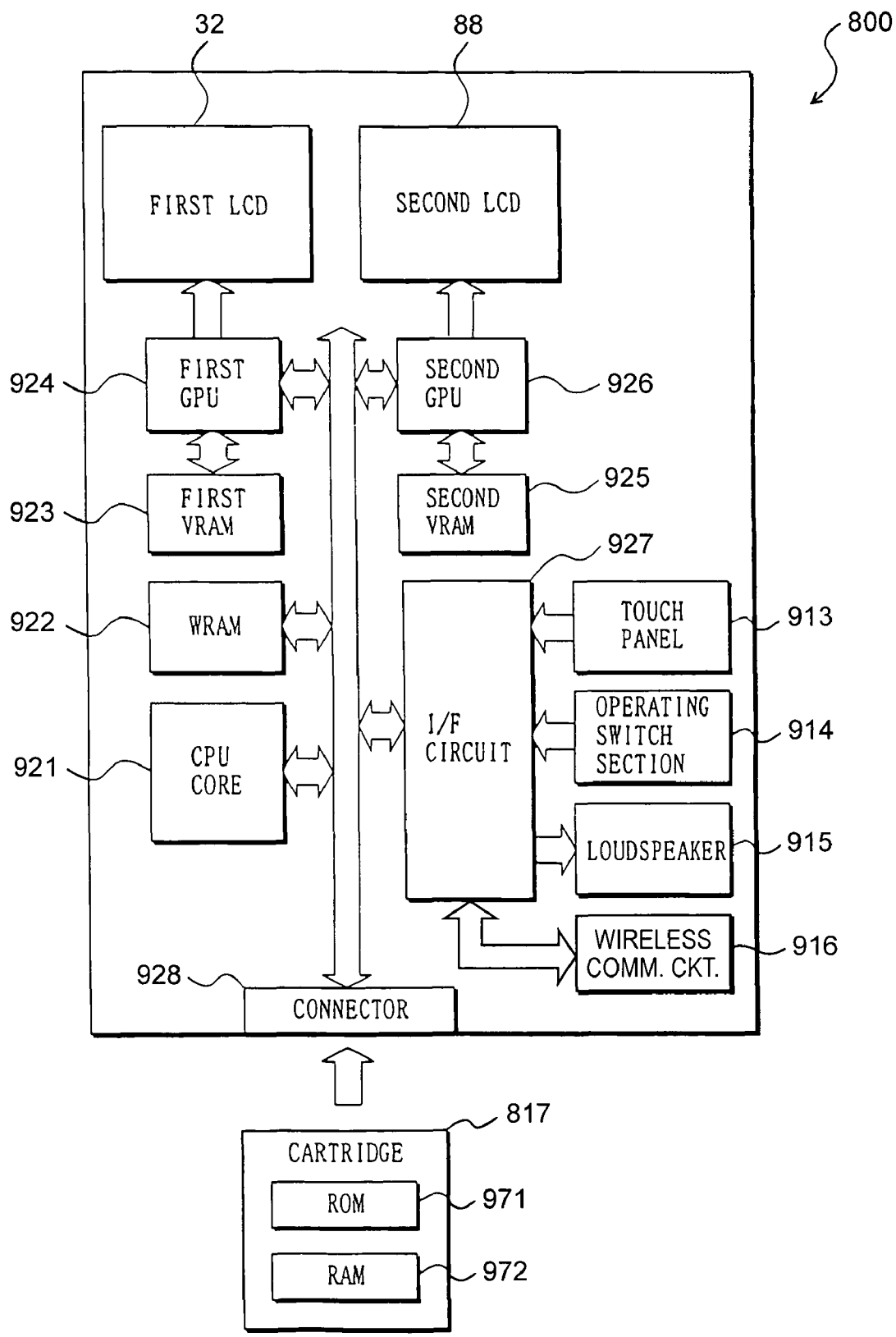
FIG. 4 is a block diagram of example circuitry for the game machine shown in FIGS. 2 and 3.

By way of illustration without limitation, FIGS. 2-4 show a specific example of a product in which the error codes described herein may be used.

Referring to FIGS. 2 and 3, a game device 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game device is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 (FIG. 3) and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the exemplary embodiment is a backlit, color liquid crystal display (LCD). This screen is touch sensitive and may be activated by a stylus or a finger. A power button 34 is located in the upper left corner of face 26 and is used to turn the game device 10 on and off. A cross-shaped directional control button 36 is located adjacent and below the power button 34, and is used for game play control.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for game play control. A microphone 44 (which may, for example, be an omni-directional condenser microphone) is located below the left edge of screen 32 for use with specially designed games or other applications (e.g., voice chat) having a microphone feature. A battery recharge indicator LED 46 and a power indicator LED 48 are also located on the upper face 26, adjacent the lower edge thereof, below the right edge of screen 32.

A lower or forward portion of the peripheral edge 30 (closest to the user) is provided with a volume control slide 52 and headphone and microphone connectors 54, 56 on either side of a first game slot 58. In the example portable game system, slot 58 is especially designed for larger game cartridges or cards originally designed for use with the assignee's Game Boy Advance® game system. Of course, slot 58 may be otherwise designed.

As best seen in FIG. 3, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this example game system. The second game slot 64 is smaller than the first game slot 58, reflecting the different sizes of the game cards. Openings 66, 68 form an elbow-shaped through slot adapted for securing a wrist strap (not shown), thereby enabling the user to secure the game system to the body and thus minimize the potential for losing, misplacing or dropping the game system. A stylus port or holder, in the form of a blind bore 70 is located adjacent the wrist-strap mount for holding a stylus before or after use.

A pair of left, right control buttons (or shoulder buttons) 72, 74 are located on a peripheral edge, at the corners where the upper portion 60 of the peripheral edge meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 2) and a lower (or outer) face 84 (FIG. 3) connected by a peripheral edge 86. The upper face 82 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body. In this example portable game system, screen 88 is not provided with a touch panel structure. Of course, screen 88 may, if desired, be provided with a touch panel structure that extends over all, substantially all, or a part of the display screen.

FIG. 4 is a block diagram of a portion of example electronic circuitry for game device 10. An electronic circuit board accommodated in a housing of game device 10 includes a CPU core 921 mounted thereon. The CPU core 921 is connected through a predetermined path to a connector 928 for connection to the cartridge 817, and also connected to an input and output interface (I/F) circuit 927, a first graphics processing unit (GPU) 924, a second GPU 926, and a working RAM (WRAM) 922.

The cartridge 817 is detachably connected to the connector 928. Cartridge 817 is a storage medium having a program stored therein, and specifically includes a ROM 971 in which the program is stored and a RAM 972 for storing backup data in a rewritable manner. The program stored in the ROM 971 of the cartridge 817 is loaded to the WRAM 922, and then implemented by the CPU core 921. The WRAM 922 stores temporary data obtained by the CPU core 921 implementing the program or data for generating images.

The I/F circuit 927 is connected to a touch panel 913, an operating switch section 914 (including, e.g., power button 34, cross-shaped directional control button 36, start button 38, select button 40, and X/Y/A/B buttons 42), a loudspeaker 915, and wireless communication circuitry 916 that enables wireless communication with, among other things, wireless LAN access point(s). These wireless access points can provide, among other things, a connection to the Internet. The access points may be provided in public areas (e.g., stores, libraries, sports arenas, stadiums, public transportation vehicles such as buses and trains, airplanes, etc.) or in offices or homes. For example, in a home environment, the access point may be embodied as a computer that is connected to the Internet via, for example, a dial-up connection or a cable modem. In alternative implementations, wireless or wired communication circuitry may be connected to the portable display device via one of cartridge slots (e.g., slot 58 or slot 64). For example, the communication circuitry may be embodied in a cartridge adapted to fit in one of these slots. This communication circuitry may, for example, connect by wired link to the public switched telephone network or to a local area network to thereby provide Internet access. In other implementations, the communication circuitry may wirelessly connect to a base station of a mobile telephone network through which a connection to the Internet may be established.

The first GPU 924 is connected to a first video RAM (VRAM) 923, and the second GPU 926 is connected to a second VRAM 925. The first GPU 924, responsive to an instruction from the CPU core 921, generates a first image (such as a game image or web page image) based on data for generating an image stored in the WRAM 922, and renders the generated image on the first VRAM 923. The second GPU 926, responsive to an instruction from the CPU core 921, generates a second image (such as a game image or web page image) based on data for generating an image stored in the WRAM 922, and renders the generated image on the second VRAM 925.

The first VRAM 923 is connected to the first LCD 32, and the second VRAM 925 is connected to the second LCD 88. The first GPU 924 outputs the first image rendered on the first VRAM 923 to the first LCD 32. The first LCD 32 displays the first image outputted from the first GPU 924. The second GPU 926 outputs the second image rendered on the second VRAM 925 to the second LCD 88. The second LCD 88 displays the second image outputted from the second GPU 926.

Additional details regarding the above-described game apparatus may be found in U.S. Publication Nos. 2005-0227761; 2005-0164794; and 2005-0159223 and application Ser. Nos. 10/921,921 and 11/127,297, the contents of each of which are incorporated herein in their entirety.

While using the product 1 shown in FIG. 1 (or in FIGS. 2-4), errors may occur. When such errors occur, a message may be output via output device(s) 7 of the product. In the following description, it will be assumed that the product includes (or is connected to) a display screen on which an error message is displayed. The error message provides information which may include, but is not limited to, the error, possible causes of the error, possible solutions for the error, and an error code.

In accordance with one example of the error code implementation described herein, a unique error code is generated for each product or user. For example, if the user's unique identifier is a number such as 123456, the error code generated would be the user's unique identifier followed by the standard error number for the error that has occurred. If the standard error number is "005", the error code obtained by concatenating this error number with the user's unique identifier would be "123456005".

The error code is not limited to being a concatenation of two or more error code components such as a user's unique identifier and an error number, but may be some other combination obtained by operations such as mathematical or logical operations on the components. For example, the components and the numbers therein could be reordered, and compressed by using a base-36 number, which would enable the use of alphanumeric codes.

The unique error code may also include additional and/or alternative information embedded therein. For example, a checksum number to perform error detection and/or correction may be included. The user identifier could also be replaced by or augmented with a product identifier (code) or, in the context of a network, all or part of a Media Access Control (MAC) address for the product. In particular, a supplier of a product may use Ethernet hardware from a same vendor. In this case, it would be unnecessary to transmit the portion of the MAC address that represents the vendor code. In the context of a game device, the unique error code could include an identifier for a game being played when the error occurred.

Thus, by way of example without limitation, an error code may be a concatenation, or logical or arithmetic combination, of one or more of an error number, a user identifier, a product identifier, all or part of a MAC address, a game identifier, error detection information and error correction information.

The unique error code could be presented to customer service (which could be a live customer service representative, or a voice response unit, or a website). Customer service could then rapidly identify the user from the user database and identify the error for the particular product being used. Automated queries could then take place based on this error code to identify the source of the problem. An appropriate solution could be returned to the user.

Figure 5:
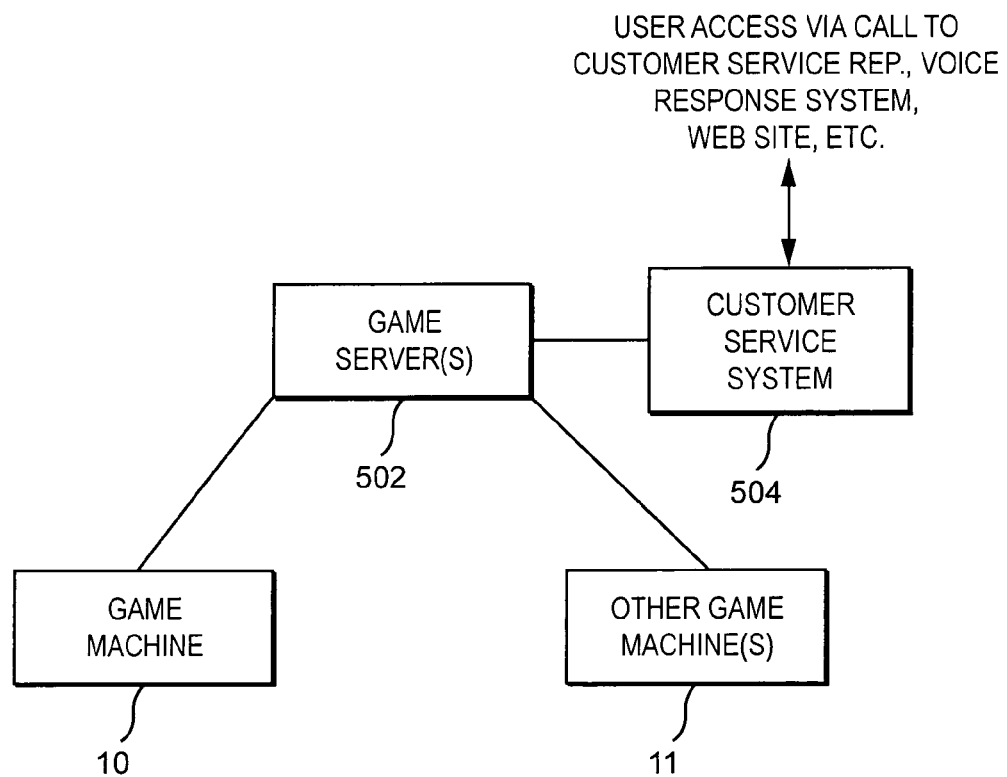
FIG. 5 shows an example online game system.

By way of example with reference to FIG. 5, assume a user uses the game machine 10 of FIGS. 2-4 to connect to a game server 502 in order to play an online game either with a game-server generated opponent or with another player whose game machine 11 (which also may be of the type shown in FIGS. 2-4) is also connected to game server 502. Game server 502 may include, or have access to, other systems or servers providing features for the online gaming system. For example, game server 502 may include or have access to an invitation server that enables a player to invite other player(s) to play a particular game. The game server may include or be connected to a customer service system 504 to deal with user inquiries regarding errors or service problems.

Figure 6:
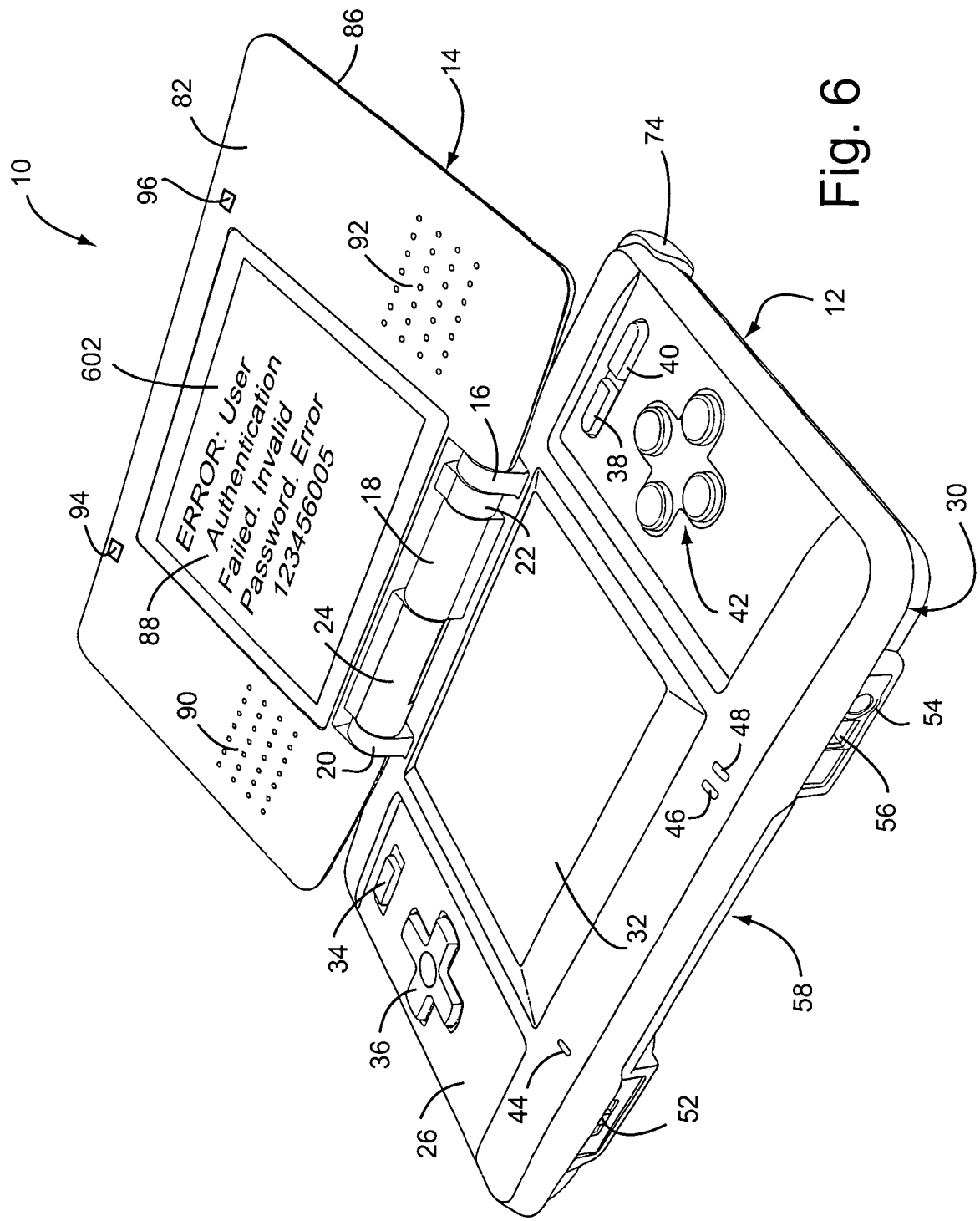
FIG. 6 shows an example error message provided for the game machine of FIGS. 2-4.

While playing a game using the online system, errors may occur. When such errors occur, typically a game will display a message on the screen describing the error and possible causes and solutions and an error number. With reference to FIG. 6, and an example message 602 might be:

"Error: User authentication failed. Invalid password. Error: 123456005"

In the above scenario, the user's unique identifier is "123456" and the normal error number associated with an invalid password is "005". Thus, the user-specific error code shown in the above message is obtained by concatenating the user's unique identifier and the normal error number.

As noted above, the user-specific error code may include additional information embedded therein to perform error detection (such as a checksum number) or to perform error correction. The user identifier could also be replaced by or augmented with one or more of a hardware identifier or product identifier or all or part of MAC address of the user's game device, which also could uniquely identify the user. The user-specific error code could be reordered, and compressed by using a base-36 number, which would enable the use of alphanumeric codes. Further information could be appended to this user-specific error code that would identify the game being played.

The customer service system generally includes an input section that is supplied with an error code generated as described herein. The code may be supplied to the input section by a customer service representative, or via a website, for example. A processing section of the customer service system uses the error code to provide information to the user relating to the error.

By way of further example, in the error case described above, when the user accesses customer service system 504 and provides the unique error code thereto either via a customer service representative, a voice-activated response system or a website, the customer service system 504 checks a user database (which may be maintained in the game server 502, for example) for user "123456" to see which password the user attempted to use on the last login (i.e., the login that failed). If the password used was once a valid password, and the user recently changed the password, the customer service system 504 could return a response to the user such as "The password you entered is no longer valid, because you changed your password on Dec. 21, 2004. Please use your new password to log in." Thus, the user-specific error code can be used to generate a response that is specific to a particular user (e.g., the user changed passwords on a particular date).

While certain systems and methods have been described in connection with example embodiments and implementations, it is to be understood that various modifications and equivalent arrangements of these systems and methods are included within the spirit and scope of the appended claims.

I claim:

1. A method for generating an error code comprising:
   detecting an error condition of a product; and
   generating an error code by combining information indicative of the detected error condition with an identifier associated with the product, wherein the identifier identifies a particular user of the product.

2. The method according to claim 1, wherein the identifier identifies both the product and a user of the product.

3. The method according to claim 1, wherein the identifier identifies a model of the product.

4. The method according to claim 1, wherein the combining comprises concatenating the information indicative of the detected error condition and the identifier associated with the product.

5. The method according to claim 1, wherein the combining comprises arithmetically combining the information indicative of the detected error condition and the identifier associated with the product.

6. The method according to claim 1, wherein the combining comprises logically combining the information indicative of the detected error condition and the identifier associated with the product.

7. The method according to claim 1, wherein the information indicative of the detected error condition comprises an alphanumeric string.

8. A system for generating an error code comprising:
   a detector for detecting an error condition of a product; and
   an error code generator for generating an error code by combining information indicative of the detected error condition with an identifier associated with the product, wherein the identifier identifies a particular user of the product.

9. The system according to claim 8, wherein the identifier identifies both the product and a user of the product.

10. The system according to claim 8, wherein the identifier identifies a model of the product.

11. The system according to claim 8, wherein the combining comprises concatenating the information indicative of the detected error condition and the identifier associated with the product.

12. The system according to claim 8, wherein the combining comprises arithmetically combining the information indicative of the detected error condition and the identifier associated with the product.

13. The system according to claim 8, wherein the combining comprises logically combining the information indicative of the detected error condition and the identifier associated with the product.

14. The system according to claim 8, wherein the information indicative of the detected error condition comprises an alphanumeric string.

15. A customer service system comprising:
   an input section supplied with an error code including information indicative of an error condition of a product and an identifier associated with the product; and
   a processor that uses the information indicative of the error condition and the identifier to provide information for the product relating to the error condition, wherein the identifier identifies a particular user of the product.

16. A computer-readable storage medium storing a computer program executed by a processor and causing a computer to perform:
   detecting an error condition of a product; and
   generating an error code by combining information indicative of the detected error condition with an identifier associated with the product, wherein the identifier identifies a particular user of the product.

* * * * *